(12) United States Patent  Owens et al.

(10) Patent No.: US 10,279,886 B2
(45) Date of Patent: May 7, 2019

(54) AIRCRAFT FLOOR PANEL

(71) Applicant: Goodrich Corporation, Charlotte, NC (US)

(72) Inventors: George Owens, Akron, OH (US); Kevin E. Roach, Stow, OH (US); Kurt M. Tauscher, Kent, OH (US)

(73) Assignee: Goodrich Corporation, Charlotte, NC (US)

( * ) Notice: Subject to any disclaimer, the term of this patent is extended or adjusted under 35 U.S.C. 154(b) by 254 days.

(21) Appl. No.: 15/149,966

(22) Filed: May 9, 2016

(65) Prior Publication Data

US 2016/0340020 A1    Nov. 24, 2016

Related U.S. Application Data

(60) Provisional application No. 62/164,945, filed on May 21, 2015.

(51) Int. Cl.
| | |
|---|---|
| *B64D 11/00* | (2006.01) |
| *B64C 1/18* | (2006.01) |
| *B64C 1/40* | (2006.01) |
| *B64D 13/08* | (2006.01) |
| *F24D 13/02* | (2006.01) |
| *B64C 1/00* | (2006.01) |

(52) U.S. Cl.
CPC .............. *B64C 1/18* (2013.01); *B64C 1/40* (2013.01); *B64D 13/08* (2013.01); *F24D 13/024* (2013.01); *B64C 2001/0072* (2013.01); *Y02B 30/26* (2013.01)

(58) Field of Classification Search
CPC .............. B64C 1/18; B64C 1/40; B64D 13/08
See application file for complete search history.

(56) References Cited

U.S. PATENT DOCUMENTS

| | | | | |
|---|---|---|---|---|
| 6,834,159 B1* | 12/2004 | Schramm | ................ | B32B 15/04 392/435 |
| 2002/0168184 A1* | 11/2002 | Meisiek | .................... | B64C 1/18 392/435 |
| 2010/0065686 A1* | 3/2010 | Tauscher | ................... | B64C 1/18 244/129.1 |
| 2016/0121993 A1* | 5/2016 | Nehring | .................... | B64C 1/18 244/118.5 |

FOREIGN PATENT DOCUMENTS

| | | |
|---|---|---|
| EP | 1046576 A2 | 10/2000 |
| EP | 2113456 A2 | 11/2009 |
| EP | 3015360 A1 | 5/2016 |
| WO | WO0117850 A1 | 3/2001 |

OTHER PUBLICATIONS

Partial European Search Report for Application No. 16170476.2, dated Oct. 4, 2016, 8 Pages.

* cited by examiner

*Primary Examiner* — Richard G Davis
(74) *Attorney, Agent, or Firm* — Kinney & Lange, P.A.

(57) ABSTRACT

An aircraft heated floor panel includes a first support layer, a second support layer, and a heating layer located between the first support layer and the second support layer. An aircraft floor panel includes a floor panel body and a removal feature that provides a mechanism for the aircraft floor panel to be removed from an attached aircraft structure.

10 Claims, 6 Drawing Sheets

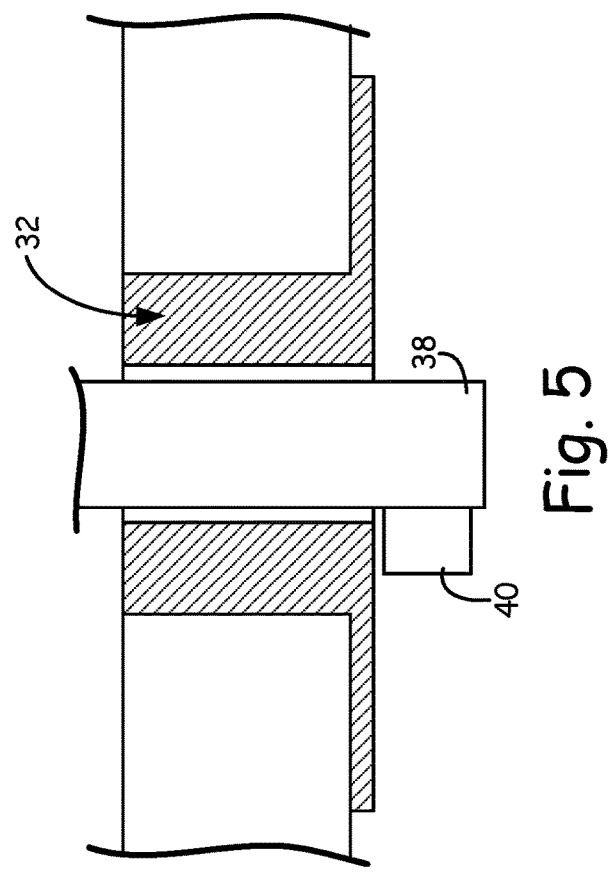
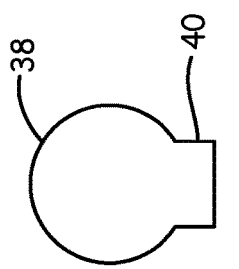
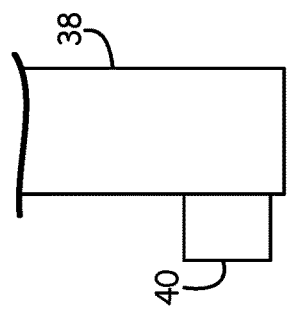

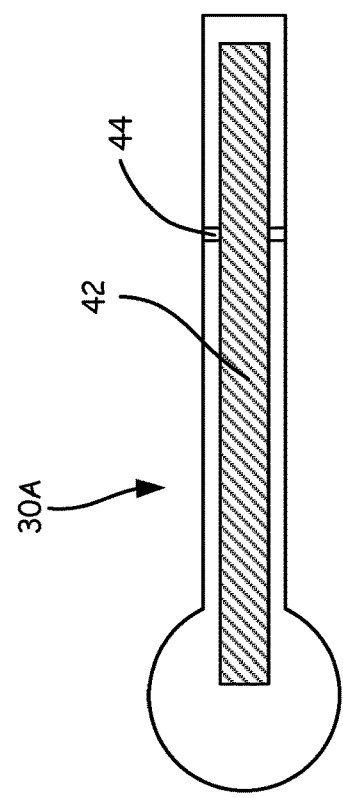
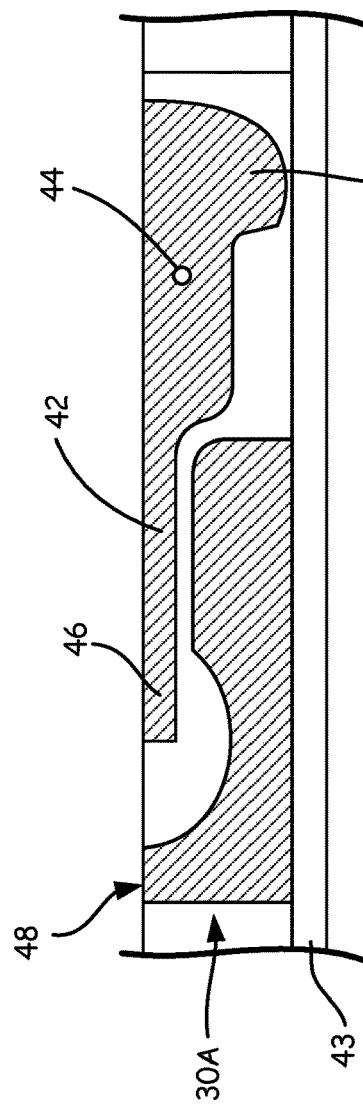
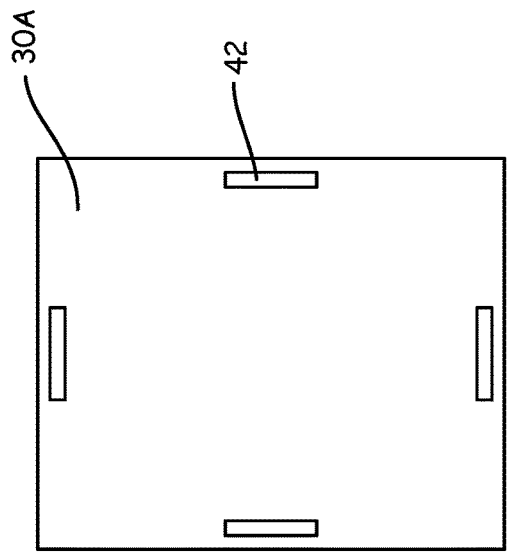

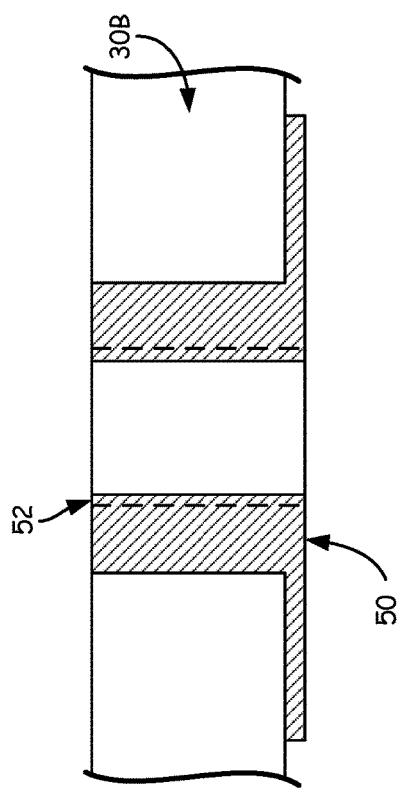
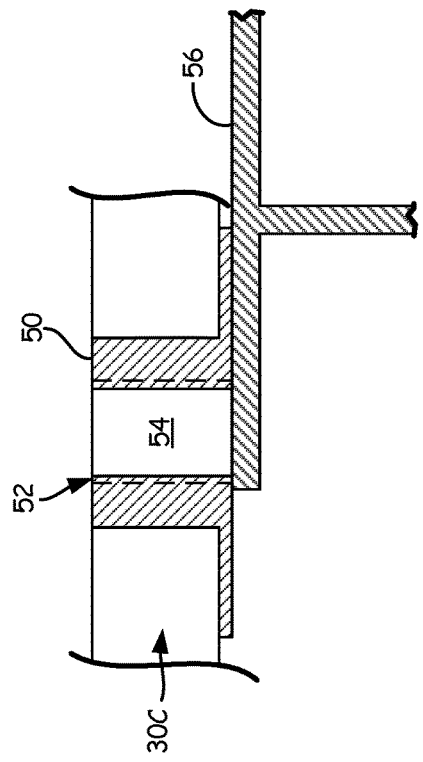

AIRCRAFT FLOOR PANEL

CROSS-REFERENCE TO RELATED APPLICATION(S)

This application claims the benefit of U.S. Provisional Application No. 62/164,945 filed May 21, 2015 for "Aircraft Floor Panel" by George Owens, Kevin E. Roach, and Kurt M. Tauscher.

BACKGROUND

An aircraft commonly includes heated floor panels in order to maintain the cabin at a comfortable temperature. The floor panels are typically supported by an aircraft structure arranged, for example, in a grid-like pattern. The floor panels have structural integrity sufficient to support the weight of people and objects resting on the panels. A metal face sheet typically forms the top surface of the panel to protect the underlying layers from punctures from high heels, chips from dropped objects, scratches from dragged luggage and/or other floor-traffic related hazards. Some type of floor covering (e.g., carpeting, tiling) is typically placed over the panels for comfort and/or appearance. A heated floor panel can include a weight-supporting layer and a heat-generating layer. The floor panel can also include a heat-insulating layer to prevent heat from exiting the aircraft compartment.

The heat-generating layer of the heated floor panels is typically placed just under the metal sheet or near the top surface of the floor. This makes the heating elements of the floor panels susceptible to damage (mechanical or due to fluid intrusion) during installation, maintenance or general use. The location of the heating element also makes localized repair to the metal face sheet or the top surface of the floor difficult.

Additionally, aircraft floor panels are difficult to remove without damage to the panel. Floor panels are located very close together and no current tools or methods exist to extract floor panels without high risk of damage. Typical damage includes edge damage from prying with tools such as prybars and screwdrivers that can compromise the metal or composite panel structure. In the case of heated floor panels, damage can render the heating elements of the floor panel non-functional.

SUMMARY

An aircraft heated floor panel includes a first support layer, a second support layer, and a heating layer located between the first support layer and the second support layer.

An aircraft floor panel includes a floor panel body and a removal feature that provides a mechanism for the aircraft floor panel to be removed from an attached aircraft structure.

BRIEF DESCRIPTION OF THE DRAWINGS

FIGS. 4A and 4B are views of a tool configured to remove the floor panel of FIG. 3A.
FIG. 5 illustrates the tool engaged with the floor panel of FIG. 3A.
FIG. 6 is a top view of a floor panel.
FIG. 7A a detailed view of a section of the floor panel of FIG. 6.
FIG. 7B is a cross section view of the floor panel of FIG. 7A.
FIG. 8 is a cross section view of a floor panel.
FIG. 9 is a cross section view of a floor panel and a mounting structure.

DETAILED DESCRIPTION

Figure 1:
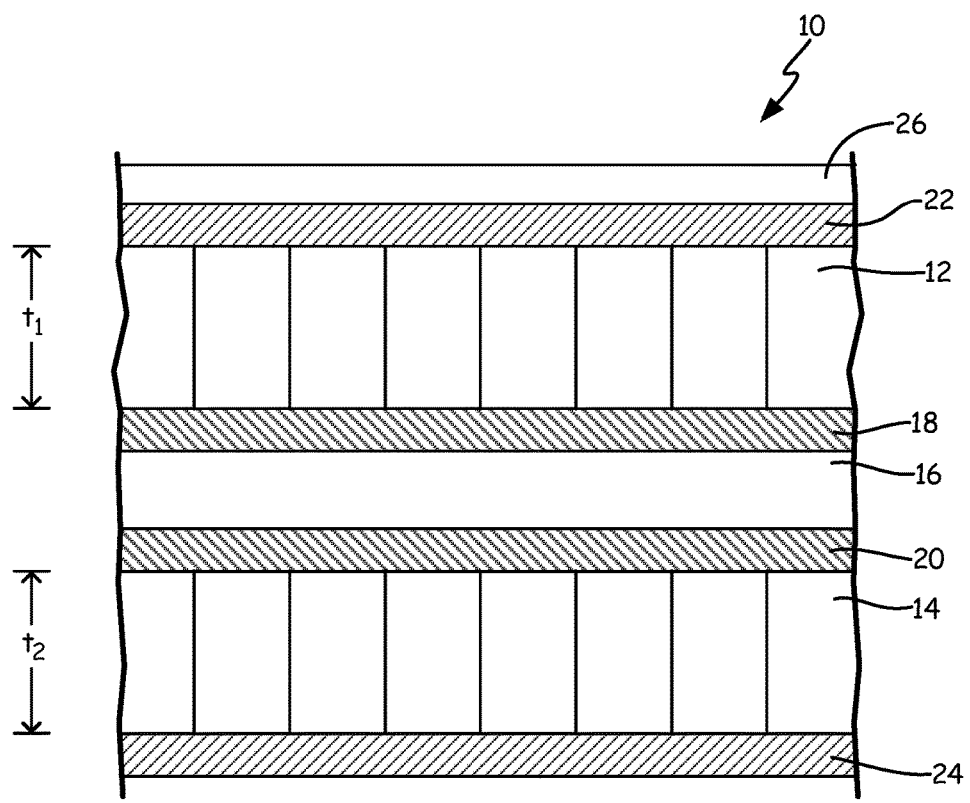
FIG. 1 is a cross sectional view of a heated floor panel.

FIG. 1 illustrates a cross sectional view of a heated floor panel. The uppermost surface of the panel shown in FIG. 1 is the top (external) surface of an installed floor panel. Heated floor panel 10 includes support layers 12 and 14, heating layer 16, adhesive layers 18 and 20, reinforcing layers 22 and 24 and floor covering 26.

Support layers 12 and 14 are weight-bearing and/or layers. Support layers 12 and 14 can be formed from a honeycomb material as shown in FIG. 1. Suitable honeycomb materials include Nomex® (flame resistant aramid material) and Kevlar® (para-aramid synthetic fibers), both available from E. I. du Pont de Nemours and Company, Wilmington, Del. In some embodiments, honeycomb layers are sandwiched between carbon fiber prepreg layers and/or fiberglass epoxy prepreg layers. Support layers 12 and 14 can also be formed of a foam or other core material. Suitable materials for foam layers include polyamide foams. Additional and different support layers 12 and 14 that provide sufficient stiffness, satisfy thickness limitations, and accommodate weight considerations can also be used.

Support layers 12 and 14 can be of the same type (e.g., two honeycomb layers). Support layers 12 and 14 can contain the same material (e.g., identical honeycomb layers). Support layers 12 and 14 can also be of different types. In one embodiment, support layer 12 is a honeycomb layer and support layer 14 is a foam layer. In this embodiment, honeycomb layer 12 provides additional structural support above heating layer 16 while foam layer 14 provides additional insulating properties below heating layer 16.

As shown in FIG. 1, support layer 12 has thickness $t_1$ and support layer 14 has thickness $t_2$. In some embodiments, thickness $t_1$ and thickness $t_2$ are roughly equal. In cases where thickness $t_1$ and thickness $t_2$ are roughly equal, manufacturing heated floor panel 10 is easier to make flat due to the expansion and contraction of the various composite layers present in floor panel 10. In other embodiments one of thicknesses $t_1$ and $t_2$ is greater than the other depending on the structural and/or insulating requirements of a floor installation. Generally, the thicker support layer 12 or 14 will be no more than twice the thickness of the thinner support layer 12 or 14.

Heating layer 16 can include an electrothermal heater. The electrothermal heater can be an electrically resistive element electrically isolated in a dielectric material. The element can be an etched foil type element or a wire and/or the element may be configured in a zig-zag type arrangement. The element can be isolated by encapsulation by disposing it between plies of an appropriate curable material such as thermoset plastic or any other dielectric or electrically non-conductive material. For example, the plies may be made of a polyimide film, such as Kapton®, available from E. I. du Pont de Nemours and Company. In some embodiments, heating layer 16 is inset a distance from the edges of floor panel 10 to protect the element of heating layer 16. For example, heating layer 16 can be inset about 6.35 mm (0.25 inches) from the outer edges of panel 10 so that fluid from a spill or a cleaning solution does not run down the side of panel 10 and into heating layer 16. Insetting heating layer 16 can also reduce damage to heating layer 16 if one or more edges of heated floor panel 10 is damaged.

Adhesive layers 18 and 20 are located between support layer 12 and heating layer 16 and heating layer 16 and support layer 14, respectively. In some embodiments, adhesive layers 18 and 20 include a film adhesive (e.g., an epoxy). In other embodiments, adhesive layers 18 and 20 include a prepreg (composite fibers impregnated with a matrix material such as an epoxy) having a high resin content. Film adhesive and resin-rich prepreg are used to increase the bond strength between heating layer 16 and support layers 12 and 14. Adhesive layers 18 and 20 should be capable of withstanding elevated curing temperatures so that, during the curing process, adhesive layers 18 and 20 will facilitate the bonding of the support layers 12 and 14 to heating layer 16. Adhesive layers 18 and 20 can incorporate a scrim if necessary or desired for better distribution of the adhesive.

Reinforcing layers 22 and 24 provide additional structural reinforcement to heated floor panel 10. In some embodiments, reinforcing layers 22 and 24 include multiple plies of a composite prepreg. Reinforcing layers 22 and 24 can include carbon fibers, fiberglass, Kevlar® or other reinforced polymer matrix materials. In some embodiments, heated floor panel includes floor covering 26 as a top layer. Floor covering 26 can include composite prepreg plies with an outer metallic skin. In embodiments in which floor covering 26 is omitted, reinforcing layer 22 serves as the top layer of heated floor panel 10.

Locating heating layer 16 between two support layers (12 and 14) offers increased protection to the heating element of heating layer 16. Support layer 12 protects heating layer 16 from mechanical damage during installation, maintenance and use and from fluid intrusion during operation (spills, etc.) and maintenance (e.g., cleaning). The structural loads encountered by heating layer 16 can be less severe. Moving heating layer 16 away from the top surface of heated floor panel 10 also allows for localized repair of support layer 12 and/or reinforcing layer 22 without damage to heating layer 16.

FIGS. 2 through 10 illustrate different embodiments of floor panels and mechanisms that facilitate improved removal of floor panels from structures to which they are attached. Floor panels (heated or not) are often bolted and sealed to a mounting structure with caulk or other sealant. Due to the proximity of adjacent floor panels, the removal of individual floor panels is difficult and prone to cause damage to the floor panel being removed or surrounding panels. The present disclosure describes features for improving the removal of floor panels.

Figure 3A:
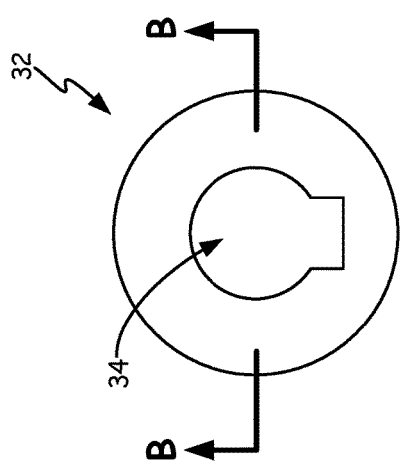
FIG. 3A a detailed view of a section of the floor panel of FIG. 2.
Figure 3B:
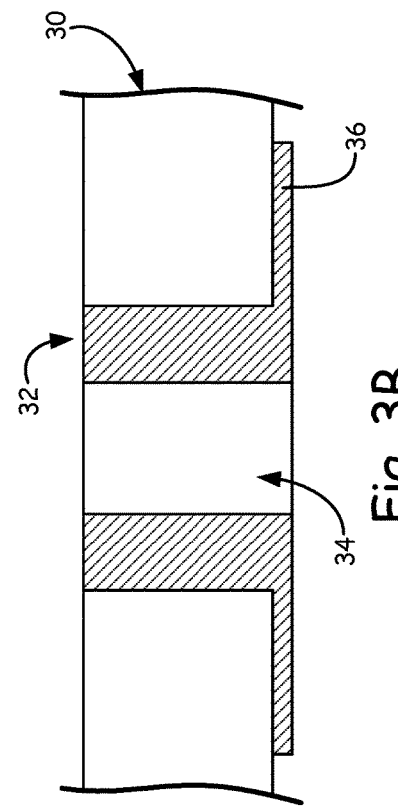
FIG. 3B is a cross section view of the floor panel of FIG. 3A.
Figure 2:
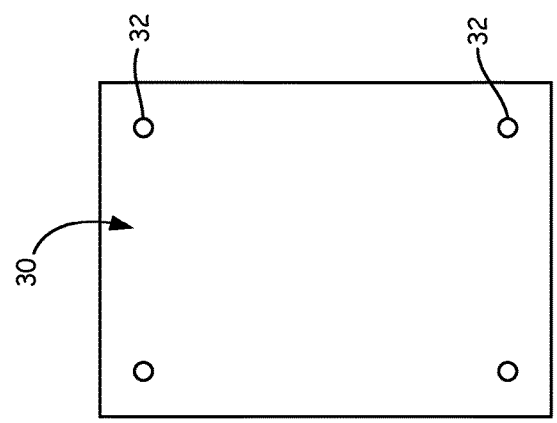
FIG. 2 is a top view of a floor panel.

FIG. 2 is a top view of floor panel 30. Floor panel 30 includes inserts 32, which are illustrated further in FIGS. 3A (top view) and 3B (cross section). FIG. 3A shows insert 32 with keyhole shaped opening 34. Insert 32 is positioned within a hole in floor panel 30 that extends from the top surface to the bottom surface. In some embodiments, insert 32 includes a flange (flange 36) that is flush with the bottom surface of floor panel 30. Opening 34 is shaped to allow a tool to be inserted through insert 32 for panel removal. FIGS. 4A and 4B illustrate one example of such a tool. Tool 38 includes projection 40. Tool 38 with projection 40 is shaped to fit within opening 34 so that it can pass through insert 32. Tool 38 can then be rotated so that projection 40 interfaces with the bottom surface of panel 30. Tool 38 can then be used to pull panel 30 in an upwards direction with projection 40 applying force to panel 30 as shown in FIG. 5.

FIG. 6 is a top view of another embodiment of a floor panel. Floor panel 30A includes levers 42, which are illustrated further in FIGS. 7A (top view) and 7B (cross section). Levers 42 are integrated into floor panel 30A above the aircraft structure to which floor panels 30A are attached (structure 43). Levers 42 are attached to floor panel 30A with pin 44. When end 46 of lever 42 is lifted, lever 42 rotates about pin 44 so that opposite end 47 of lever 42 exerts force on aircraft structure 43, pushing floor panel 30A away from aircraft structure 43. As shown in FIG. 7B, lever 42 can belong to insertable body 48 that is positioned within an opening in floor panel 30A.

FIG. 8 is a cross section view of a floor panel similar to that illustrated in FIG. 2. Floor panel 30B includes threaded insert 50. Threaded insert 50 includes threads 52 along its inner surface. A tool with a threaded end (not shown) can be inserted into insert 50 so that the threads of the tool engage with threads 52. The tool can then be used to pull up on floor panel 30B and remove it from the structure to which it is attached. Alternatively, a fastener can be threaded into the insert and the head of the fastener can be gripped and used to pull up on panel 30B.

FIG. 9 is a cross section view of a floor panel and a mounting structure. Floor panel 30C includes threaded insert 50 as described above. Fastener 54 is inserted within threaded insert 50. Fastener 54 is rotated with a tool (e.g., screwdriver) so that it engages with mounting structure 56. As fastener 54 rotates, it pushes mounting structure 56 and panel 30C away from one another, separating panel 30C from mounting structure 56.

Figure 10:
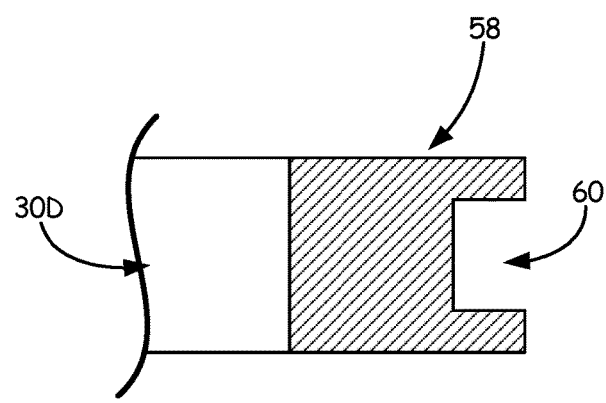
FIG. 10 is a cross section view of a floor panel.

FIG. 10 is a cross section view of a floor panel having an edge with a recess. Floor panel 30D includes edge 58. Edge 58 contains recess 60 in which a tool can interface so that floor panel 30D can be removed from an attached aircraft structure. A tool (not shown) is received by recess 60 and an upward force exerted by the tool is used to pull up on floor panel 30D. Edge 58 can extend along the length of an entire side edge of floor panel 30D. Alternatively, edge 58 can extend along only a portion of the entire side edge of floor panel 30D. In some embodiments, edge 58 is formed by a plug of material attached to an opening in floor panel 30D. The plug can include a structural epoxy, fiberglass, machined metal or other material robust enough to withstand the forces necessary to remove floor panel 30D from the attached aircraft structure. In some embodiments, areas where the tool is to be inserted to pry or lift edge 58 can be labeled on the top surface of floor panel 30D to prevent damage to floor panel 30D.

The above described floor panels 30, 30A, 30B, 30C and 30D provide means for removing the floor panels from an attached aircraft structure while minimizing damage to the removed floor panels as well as those adjacent to the removed panel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft heated floor panel comprising:
   an uppermost layer;
   a first support layer;
   a second support layer; and
   a heating layer located between the first support layer and the second support layer;
   wherein the first support layer is located on a side of the heating layer adjacent the uppermost layer; and
   wherein the first support layer comprises a honeycomb material, and the second support layer comprises a foam material.

2. The aircraft heated floor panel of claim 1, wherein the first and second support layers are weight-bearing layers.

3. The aircraft heated floor panel of claim 1, wherein the heating layer comprises a resistive heating element.

4. The aircraft heated floor panel of claim 3, wherein the resistive heating element is encapsulated in cured thermoset plastic plies.

5. The aircraft heated floor panel of claim 1, wherein the support layers are sandwiched between fiber layers.

6. The aircraft heated floor panel of claim 1, wherein the uppermost layer is:
   an external floor layer located adjacent the first support layer on a side opposite the heating layer.

7. The aircraft heated floor panel of claim 1, further comprising:
   a first adhesive layer located between the first support layer and the heating layer, wherein the first adhesive layer comprises a film adhesive or a prepreg; and
   a second adhesive layer located between the second support layer and the heating layer, wherein the second adhesive layer comprises a film adhesive or a prepreg.

8. The aircraft heated floor panel of claim 1, wherein the first support layer has a first thickness and the second support layer has a second thickness, and wherein a ratio of the first thickness to the second thickness is between about 1:2 and 2:1.

9. The aircraft heated floor panel of claim 1, wherein the first and second thicknesses are substantially equal.

10. An aircraft floor panel comprising:
    the heated floor panel of claim 1; and
    a removal feature that provides a mechanism for the aircraft floor panel to be removed from an attached aircraft structure.

* * * * *

UNITED STATES PATENT AND TRADEMARK OFFICE
CERTIFICATE OF CORRECTION

PATENT NO. : 10,279,886 B2  
APPLICATION NO. : 15/149966  
DATED : May 7, 2019  
INVENTOR(S) : George Owens, Kevin E. Roach and Kurt M. Tauscher Page 1 of 1

It is certified that error appears in the above-identified patent and that said Letters Patent is hereby corrected as shown below:

In the Specification

Column 2, Line 19:
Delete "and/or"
Insert --and/or insinulating--

Signed and Sealed this
Twenty-fifth Day of June, 2019

Andrei Iancu
*Director of the United States Patent and Trademark Office*